US012803293B2

(12) United States Patent
Chin et al.

(10) Patent No.: US 12,803,293 B2
(45) Date of Patent: Nov. 17, 2026

(54) SYSTEMS AND METHODS FOR ADAPTIVE INPUT CURRENT LIMIT CONTROL

(71) Applicant: Dell Products L.P., Round Rock, TX (US)

(72) Inventors: Yu-Chi Chin, Sunnyvale, CA (US); Chia-Jung Tsai, New Taipei City (TW); Chin-Jui Liu, Taoyuan City (TW); Shih-Hsien Yang, Taipei (TW); Merle J. Wood, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/909,241

(22) Filed: Oct. 8, 2024

(65) Prior Publication Data

US 2026/0100591 A1 Apr. 9, 2026

(51) Int. Cl.
*G06F 1/00* (2006.01)
*G06F 11/30* (2006.01)
*H02J 7/06* (2006.01)
*H02J 7/40* (2026.01)

(52) U.S. Cl.
CPC *H02J 7/06* (2013.01); *H02J 7/40* (2026.01); *H02J 2207/20* (2020.01)

(58) Field of Classification Search
CPC ...................................... H02J 7/06; H02J 7/40
See application file for complete search history.

(56) References Cited

U.S. PATENT DOCUMENTS

| | | | | |
|---|---|---|---|---|
| 2007/0229024 A1* | 10/2007 | Li | G05F 1/66 | 320/111 |
| 2011/0121653 A1* | 5/2011 | Hartular | H02J 1/10 | 307/66 |
| 2011/0234151 A1* | 9/2011 | Uan-Zo-li | H02J 7/34 | 320/137 |
| 2012/0139500 A1* | 6/2012 | Ye | H02J 7/865 | 320/135 |
| 2013/0227319 A1* | 8/2013 | Ye | G06F 1/20 | 713/320 |
| 2017/0269679 A1* | 9/2017 | Atkinson | G05F 5/00 | |
| 2018/0083477 A1* | 3/2018 | Tian | H02J 7/02 | |
| 2020/0225721 A1* | 7/2020 | Yu | G06F 1/30 | |
| 2020/0358295 A1* | 11/2020 | Lim | H02J 7/02 | |

(Continued)

*Primary Examiner* — Mohammed H Rehman
(74) *Attorney, Agent, or Firm* — Jackson Walker L.L.P.

(57) ABSTRACT

A power system configured to provide electrical energy to information handling resources of the information handling system, and a management controller communicatively coupled to the processor and the power system. The power system may include a buck voltage regulator configured to receive a DC input voltage from an AC adapter to generate a DC main voltage, a battery for powering components of the information handling system, and a charger configured to charge the battery from the DC main voltage. The management controller may be configured to receive from the buck voltage regulator an input current signal indicative of a first electrical current drawn by the buck voltage regulator from the AC adapter, perform a comparison of the input current signal to a maximum current rating of the AC adapter, and control a second electrical current drawn by the charger from the DC main voltage based on the comparison.

21 Claims, 2 Drawing Sheets

(56) References Cited

U.S. PATENT DOCUMENTS

| | | | | |
|---|---|---|---|---|
| 2021/0336466 | A1* | 10/2021 | Liu | H02J 7/933 |
| 2024/0317099 | A1* | 9/2024 | Wang | B60L 53/18 |
| 2026/0100591 | A1* | 4/2026 | Chin | H02J 7/06 |

* cited by examiner

SYSTEMS AND METHODS FOR ADAPTIVE INPUT CURRENT LIMIT CONTROL

TECHNICAL FIELD

The present disclosure relates in general to information handling systems, and more particularly systems and methods for adaptively controlling an input current limit to an information handling system from a power adapter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system may include a rechargeable battery or other energy storage device that may serve as an energy source to power components of the information handling system in the event that a "main" power source (e.g., an alternating current power source or a direct current power source adapted from an alternating current power source) is removed or otherwise withdrawn from the information handling system. When the main power source is present, a battery may be configured to recharge from the main power source using a charger that may selectively open or close a conductive path between the main power source and the battery.

Increasingly, information handling systems are utilizing USB Type-C PD to provide power to information handling systems via a device (e.g., a display monitor or docking station) coupled to the information handling system (e.g., in addition to or in lieu of traditional mechanisms for powering an information handling system, such as a battery or its own alternating current power source) or deliver power from an information handling system to a device (e.g., from the information handling system to a connected device such as a display monitor, external hard drive, speaker, or other peripheral). The USB PD 3.1 specification divides power into two ranges: a Standard Power Range (SPR), with a maximum charging power of 100 W and a maximum voltage of 20V, and an Extended Power Range (EPR) with three newly-added voltages of 28V, 36V, and 48V, with a maximum output power of 240 W.

Support for Type-C EPR may require a buck voltage regulator to step down a voltage input (e.g., 28V, 36V, 48V) by an alternating current (AC) power adapter down to an SPR voltage of 20V, which may then be distributed by a power system of the information handling system to other voltage regulators, including a charger for charging a battery. At all times, the power system may need to manage input power drawn from the AC adapter so as to not exceed a power rating for the AC adapter. However, in Type-C EPR architectures, the power system may also need to account for power consumption of the buck voltage regulator.

Approaches may exist for accounting for the power consumed by the buck voltage regulator, but such approaches have disadvantages. One approach may be to set a fixed derating value (e.g., 95%) to cover all device tolerances, but such approach may be inefficient. Another approach may be to scale a current limit for the charger voltage regulator based on a formula, but in a two-stage structure a single formula may not cover all conditions, and a look-up table may be needed to account for all possible conditions. Such approach may be highly complex, and may require manual maintenance of the look-up table for different configurations and/or product generations of the information handling system.

SUMMARY

In accordance with the teachings of the present disclosure, the disadvantages and problems associated with existing approaches to managing input power drawn from an AC adapter may be reduced or eliminated.

In accordance with embodiments of the present disclosure, an information handling system may include a processor, a power system configured to provide electrical energy to information handling resources of the information handling system, and a management controller communicatively coupled to the processor and the power system. The power system may include a buck voltage regulator configured to receive a direct current input voltage from an alternating current adapter to generate a direct current main voltage, a battery for powering components of the information handling system, and a charger configured to charge the battery from the direct current main voltage. The management controller may be configured to receive from the buck voltage regulator an input current signal indicative of a first electrical current drawn by the buck voltage regulator from the alternating current adapter, perform a comparison of the input current signal to a maximum current rating of the alternating current adapter, and control a second electrical current drawn by the charger from the direct current main voltage based on the comparison.

In accordance with these and other embodiments of the present disclosure, a method may be provided in an information handling system comprising a power system configured to provide electrical energy to information handling resources of the information handling system, the power system having a buck voltage regulator configured to receive a direct current input voltage from an alternating current adapter to generate a direct current main voltage, a battery for powering components of the information handling system, and a charger configured to charge the battery from the direct current main voltage. The method may include receiving from the buck voltage regulator an input current signal indicative of a first electrical current drawn by the buck voltage regulator from the alternating current adapter, performing a comparison of the input current signal to a maximum current rating of the alternating current adapter, and controlling a second electrical current drawn by the charger from the direct current main voltage based on the comparison.

In accordance with these and other embodiments of the present disclosure, an article of manufacture may include a non-transitory computer-readable medium and computer-executable instructions carried on the computer-readable medium, the instructions executable on a processing device, the instructions, when read and executed, for causing the processing device to, in an information handling system comprising a power system configured to provide electrical energy to information handling resources of the information handling system, the power system having a buck voltage regulator configured to receive a direct current input voltage from an alternating current adapter to generate a direct current main voltage, a battery for powering components of the information handling system, and a charger configured to charge the battery from the direct current main voltage: receive from the buck voltage regulator an input current signal indicative of a first electrical current drawn by the buck voltage regulator from the alternating current adapter; perform a comparison of input current signal to a maximum current rating of the alternating current adapter; and control a second electrical current drawn by the charger from the direct current main voltage based on the comparison.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
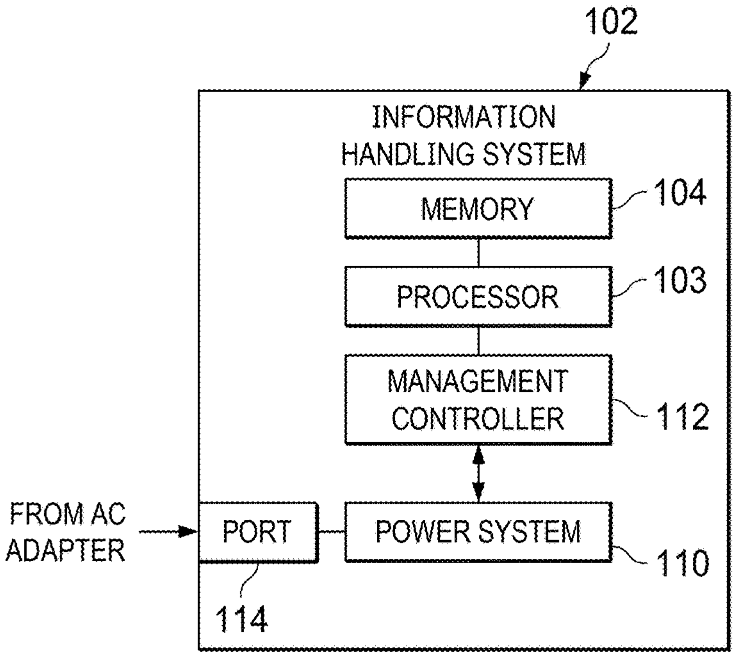
FIG. 1 illustrates a block diagram of an example information handling system, in accordance with embodiments of the present disclosure.
Figure 2:
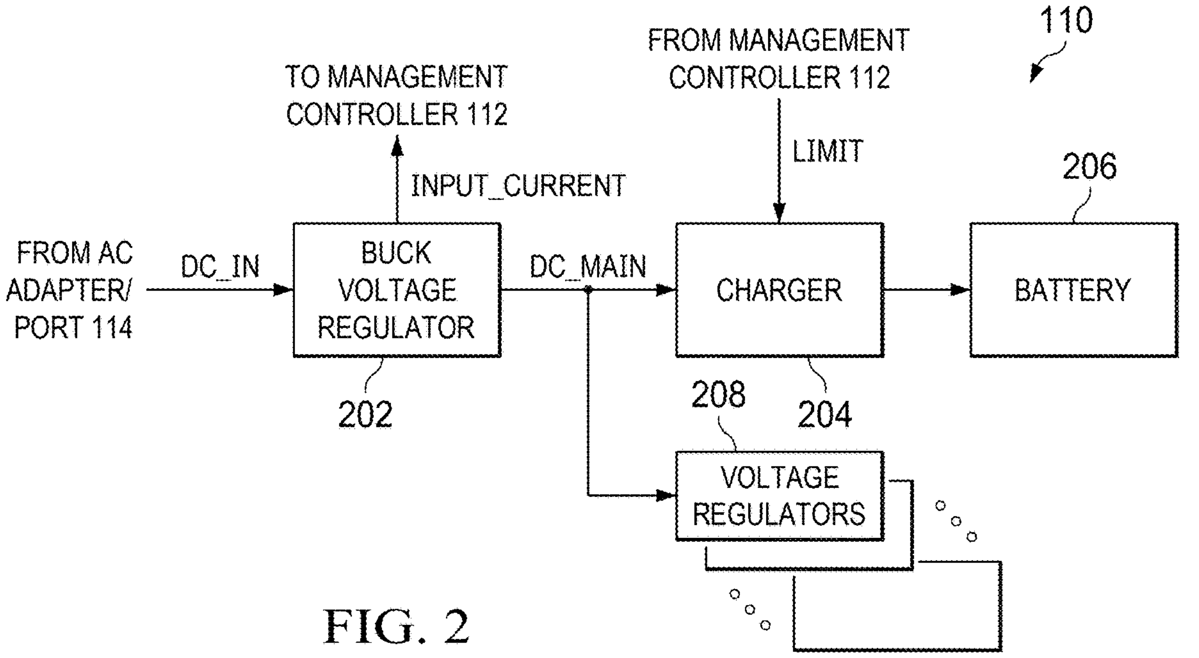
FIG. 2 illustrates a block diagram of an example power system, in accordance with embodiments of the present disclosure.
Figure 3:
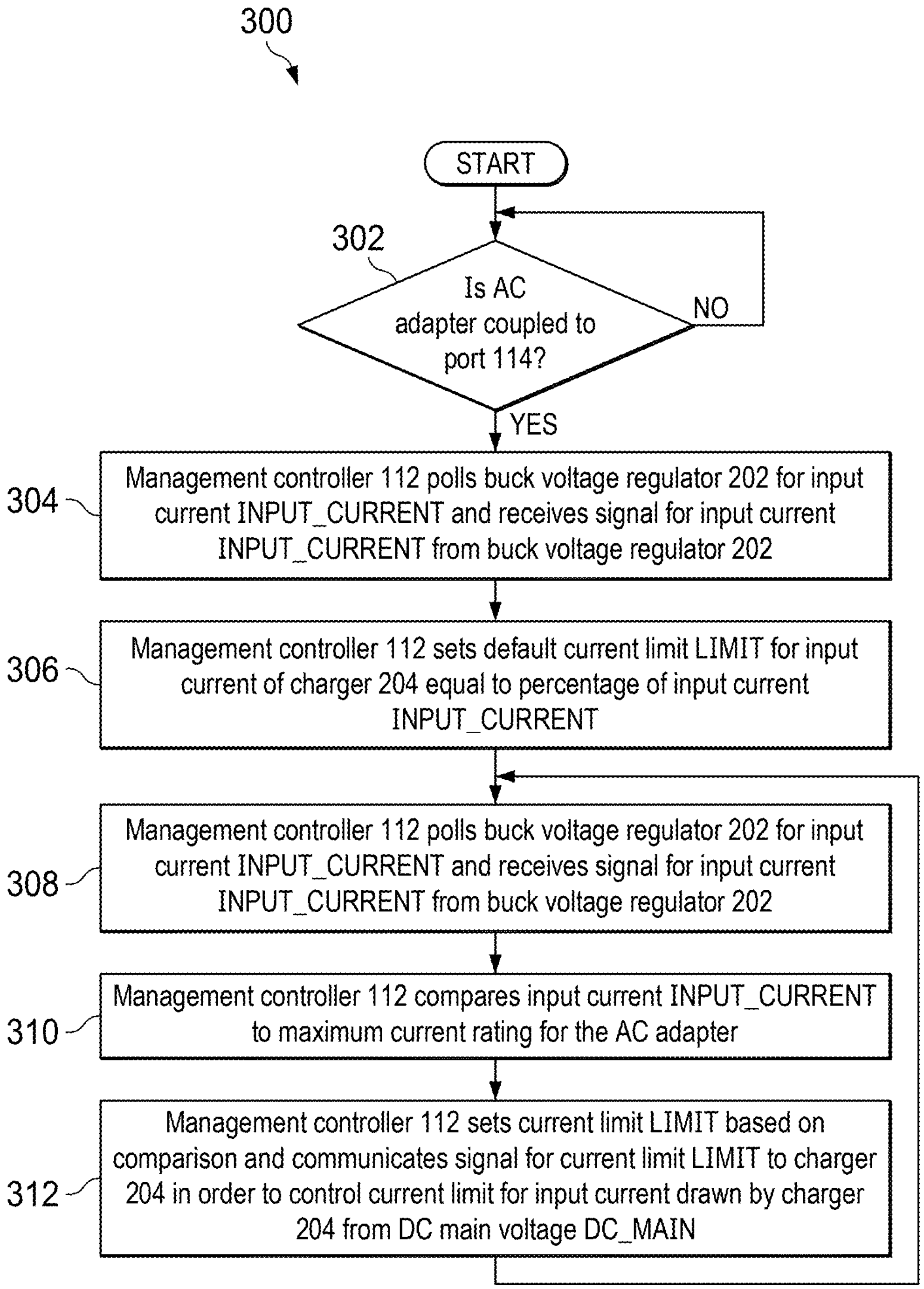
FIG. 3 illustrates a flow chart of an example method for adaptive input current limit control in a power system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example information handling system 102, in accordance with embodiments of the present disclosure. In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, a management controller 112 communicatively coupled to processor 103, a power system 110, and a port 114 electrically coupled to power system 110.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide management facilities for management of information handling system 102. Such management may be made by management controller 112 even if information handling system 102 is powered off or powered to a standby state. Management controller 112 may include a processor, a memory, and/or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller).

Generally speaking, power system 110 may include any system, device, or apparatus configured to supply electrical current to one or more information handling resources of information handling system 102. For example, power system 110 may include any system, device, and/or apparatus operable to supply direct current (DC) electrical power to one or more information handling resources.

Port 114 may include any system, device, or apparatus configured to receive electrical energy from an AC adapter. For example, in some embodiments, port 114 may comprise a socket or other receptacle configured to receive a plug. As another example, in other embodiments, port 114 may comprise a USB Type-C port. It is noted that in some embodiments, a wireless AC interface may be used in lieu of port 114.

In addition to processor 103, memory 104, management controller 112, power system 110, and port 114, information handling system 102 may include one or more other information handling resources.

FIG. 2 illustrates a block diagram of an example power system 110, in accordance with embodiments of the present disclosure. As shown in FIG. 2, power system 110 may include buck voltage regulator 202, charger 204, battery 206, and one or more other voltage regulators 208.

Buck voltage regulator 202 may comprise any suitable system, device, or apparatus configured to receive a DC input voltage DC_IN from an AC adapter and port 114 and convert DC input voltage DC_IN to a DC main voltage DC_MAIN which may be delivered to charger 204 and one or more other voltage regulators 208. For example, in some embodiments, DC input voltage DC_IN may be an EPR voltage (e.g., 28V, 36V, 48V) and DC main voltage DC_MAIN may be significantly lower than the EPR voltage (e.g., 20V).

Charger 204 may include any system, device, or apparatus configured to control a flow of charge from main voltage DC_MAIN to battery 206 in order to charge battery 206. Accordingly, in some embodiments, charger 204 may comprise a voltage regulator.

Battery 206 may comprise any system, device, or apparatus comprising one or more electrochemical cells that convert stored chemical energy into electrical energy for delivery to information handling resources of information handling system 102, as well as recharge in response to electric current delivered to battery 206 from charger 204, which may reverse the chemical reactions that occur during conversion of the stored chemical energy into electrical energy.

A voltage regulator 208 may include any system, device, or apparatus configured to generate a regulated voltage, which may be the same or different from main voltage DC_MAIN, to one or more information handling resources of information handling system 102.

In operation, management controller 112 may receive from buck voltage regulator 202 a signal indicative of an input current INPUT_CURRENT received by buck voltage regulator 202 from the AC adapter. Such signal may be communicated in any suitable manner, including without limitation via an Inter-Integrated Circuit (I2C) communication or System Management Bus (SMBus) communication. For example, in some embodiments, such signal may be from a current monitor pin of buck voltage regulator 202. As another example, in other embodiments, such current information may be from an internal register of buck voltage regulator 202.

Management controller 112 may compare input current INPUT_CURRENT to a maximum current rating of the AC adapter and based on the comparison, control a current limit LIMIT for a current drawn by charger 204 from DC main voltage DC_MAIN. For example, if the comparison indicates that input current INPUT_CURRENT exceeds a certain percentage (e.g., 98%) of the maximum current rating of the AC adapter, management controller 112 may decrease current limit LIMIT. As another example, if the comparison indicates that input current INPUT_CURRENT is less than a certain percentage (e.g., 96%) of the maximum current rating of the AC adapter, management controller 112 may increase current limit LIMIT. Management controller 112 may control current limit LIMIT by communicating a signal (e.g., via I2C or SMBus) to charger 204, and an internal controller of charger 204 may control operation (e.g., switching) of charger 204 to regulate the current drawn by charger 204 from DC main voltage DC_MAIN to remain at or below the current limit LIMIT set by management controller 112.

FIG. 3 illustrates a flow chart of an example method 300 for adaptive input current limit control in a power system, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may determine if an AC adapter is coupled to port 114. If an AC adapter is present, method 300 may proceed to step 304. Otherwise, method 300 may remain at step 302 until an AC adapter is coupled to port 114.

At step 304, management controller 112 may poll buck voltage regulator 202 for input current INPUT_CURRENT. In response, management controller 112 may receive the signal for input current INPUT_CURRENT from buck voltage regulator 202.

At step 306, management controller 112 may set a default current limit LIMIT for the input current of charger 204 equal to a percentage (e.g., 98%) of input current INPUT_CURRENT.

At step 308, management controller 112 may continue to poll buck voltage regulator 202 for input current INPUT_CURRENT. In response, management controller 112 may receive the signal for input current INPUT_CURRENT from buck voltage regulator 202.

At step 310, management controller 112 may compare input current INPUT_CURRENT to a maximum current rating for the AC adapter. At step 312, management controller 112 may set current limit LIMIT based on the comparison and communicate a signal for current limit LIMIT to charger 204 in order to control the current limit for input current drawn by charger 204 from DC main voltage DC_MAIN. For example, if the comparison indicates that input current INPUT_CURRENT exceeds a certain percentage (e.g., 98%) of the maximum current rating of the AC adapter, management controller 112 may decrease current limit LIMIT. As another example, if the comparison indicates that input current INPUT_CURRENT is less than a certain percentage (e.g., 96%) of the maximum current rating of the AC adapter, management controller 112 may increase current limit LIMIT.

After completion of step 312, method 300 may proceed again to step 308.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a processor;

a power system configured to provide electrical energy to information handling resources of the information handling system, the power system comprising:

a buck voltage regulator configured to receive a direct current input voltage from an alternating current adapter to generate a direct current main voltage;

a battery for powering components of the information handling system; and a charger configured to charge the battery from the direct current main voltage; and a management controller communicatively coupled to the processor and the power system and configured to:

receive from the buck voltage regulator an input current signal indicative of a first electrical current drawn by the buck voltage regulator from the alternating current adapter;

perform a comparison of the input current signal to a maximum current rating of the alternating current adapter; and control a second electrical current drawn by the charger from the direct current main voltage based on the comparison.

2. The information handling system of claim 1, wherein controlling the second electrical current comprises:

setting a limit signal indicative of a current limit for the second electrical current; and communicating the limit signal to the charger.

3. The information handling system of claim 2, wherein setting the limit signal comprises setting a default value for the limit signal equal to a predetermined percentage of the first electrical current.

4. The information handling system of claim 2, wherein setting the limit signal comprises decreasing a value for the limit signal when the input current signal exceeds a predetermined percentage of the maximum current rating.

5. The information handling system of claim 2, wherein setting the limit signal comprises increasing a value for the limit signal when the input current signal is less than a predetermined percentage of the maximum current rating.

6. The information handling system of claim 1, wherein the input current signal is from a current monitor pin of the buck voltage regulator.

7. The information handling system of claim 1, wherein the input current signal is from an internal register of the buck voltage regulator.

8. A method, in an information handling system comprising a power system configured to provide electrical energy to information handling resources of the information handling system, the power system having a buck voltage regulator configured to receive a direct current input voltage from an alternating current adapter to generate a direct current main voltage, a battery for powering components of the information handling system, and a charger configured to charge the battery from the direct current main voltage, the method comprising:

receiving from the buck voltage regulator an input current signal indicative of a first electrical current drawn by the buck voltage regulator from the alternating current adapter;

performing a comparison of the input current signal to a maximum current rating of the alternating current adapter; and controlling a second electrical current drawn by the charger from the direct current main voltage based on the comparison.

9. The method of claim 8, wherein controlling the second electrical current comprises:

setting a limit signal indicative of a current limit for the second electrical current; and communicating the limit signal to the charger.

10. The method of claim 9, wherein setting the limit signal comprises setting a default value for the limit signal equal to a predetermined percentage of the first electrical current.

11. The method of claim 9, wherein setting the limit signal comprises decreasing a value for the limit signal when the input current signal exceeds a predetermined percentage of the maximum current rating.

12. The method of claim 9, wherein setting the limit signal comprises increasing a value for the limit signal when the input current signal is less than a predetermined percentage of the maximum current rating.

13. The method of claim 8, wherein the input current signal is from a current monitor pin of the buck voltage regulator.

14. The method of claim 8, wherein the input current signal is from an internal register of the buck voltage regulator.

15. An article of manufacture comprising:

a non-transitory computer-readable medium; and computer-executable instructions carried on the computer-readable medium, the instructions executable on a processing device, the instructions, when read and executed, for causing the processing device to, in an information handling system comprising a power system configured to provide electrical energy to information handling resources of the information handling system, the power system having a buck voltage regulator configured to receive a direct current input voltage from an alternating current adapter to generate a direct current main voltage, a battery for powering components of the information handling system, and a charger configured to charge the battery from the direct current main voltage:

receive from the buck voltage regulator an input current signal indicative of a first electrical current drawn by the buck voltage regulator from the alternating current adapter;

perform a comparison of input current signal to a maximum current rating of the alternating current adapter; and control a second electrical current drawn by the charger from the direct current main voltage based on the comparison.

16. The article of claim 15, wherein controlling the second electrical current comprises:

setting a limit signal indicative of a current limit for the second electrical current; and communicating the limit signal to the charger.

17. The article of claim 16, wherein setting the limit signal comprises setting a default value for the limit signal equal to a predetermined percentage of the first electrical current.

18. The article of claim 16, wherein setting the limit signal comprises decreasing a value for the limit signal when the input current signal exceeds a predetermined percentage of the maximum current rating.

19. The article of claim 16, wherein setting the limit signal comprises increasing a value for the limit signal when the input current signal is less than a predetermined percentage of the maximum current rating.

20. The article of claim 15, wherein the input current signal is from a current monitor pin of the buck voltage regulator.

21. The article of claim 15, wherein the input current signal is from an internal register of the buck voltage regulator.

* * * * *